(12) United States Patent
Yang et al.

(10) Patent No.: US 9,888,468 B2
(45) Date of Patent: *Feb. 6, 2018

(54) METHOD AND DEVICE FOR SIGNALING CONTROL INFORMATION IN CARRIER AGGREGATION SYSTEM

(71) Applicant: LG ELECTRONICS INC., Seoul (KR)

(72) Inventors: Suck chel Yang, Anyang-si (KR); Min Gyu Kim, Anyang-si (KR); Joon Kui Ahn, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/347,367

(22) Filed: Nov. 9, 2016

(65) Prior Publication Data
US 2017/0064677 A1 Mar. 2, 2017

Related U.S. Application Data

(63) Continuation of application No. 14/543,525, filed on Nov. 17, 2014, now Pat. No. 9,516,613, which is a
(Continued)

(51) Int. Cl.
*H04W 72/04* (2009.01)
*H04L 1/00* (2006.01)
(Continued)

(52) U.S. Cl.
CPC ......... *H04W 72/042* (2013.01); *H04L 1/0026* (2013.01); *H04W 56/0005* (2013.01);
(Continued)

(58) Field of Classification Search
CPC ... H04W 24/10; H04W 72/04; H04W 72/087; H04W 72/042; H04W 56/0005; H04L 1/0026
See application file for complete search history.

(56) References Cited

U.S. PATENT DOCUMENTS

| | | | |
|---|---|---|---|
| 2005/0281226 A1 | 12/2005 | Lee et al. | |
| 2006/0084404 A1 | 4/2006 | Laroia et al. | |
| 2006/0153128 A1 | 7/2006 | Frederiksen et al. | |
| 2007/0086371 A1 | 4/2007 | Makhijani et al. | |
| 2007/0115796 A1 | 5/2007 | Jeong et al. | |
| 2008/0267127 A1* | 10/2008 | Narasimha | H04W 36/0077 370/331 |
| 2009/0245188 A1 | 10/2009 | Fukuoka et al. | |
| 2010/0014434 A1 | 1/2010 | Reznik et al. | |
| 2010/0054147 A1 | 3/2010 | Ishii | |

(Continued)

FOREIGN PATENT DOCUMENTS

EP 2282575 A1 2/2011

OTHER PUBLICATIONS

CATT, "CQI feedback for LTE-A," 3GPP TSG RAN WG1 Meeting #60, R1-100878, San Francisco, USA, Feb. 22-26, 2010, 7 pages.

(Continued)

*Primary Examiner* — Anez Ebrahim
(74) *Attorney, Agent, or Firm* — Birch, Stewart, Kolasch & Birch, LLP

(57) ABSTRACT

A method, a user equipment, and a base station for maintaining uplink synchronization in a wireless communication system supporting carrier aggregation are discussed. The method of maintaining uplink synchronization at a user equipment according to an embodiment includes receiving a physical downlink control channel (PDCCH) order. The PDCCH order indicates an initiation of a random access procedure and includes a carrier indicator field and a predefined set of values of a 1-bit flag indicating a localized/distributed resource block assignment, and a resource block assignment field. The method further includes transmitting a random access preamble through an uplink component carrier corresponding to a value of the carrier indicator field among a plurality of uplink component carriers.

20 Claims, 16 Drawing Sheets

Related U.S. Application Data continuation of application No. 13/583,448, filed as application No. PCT/KR2011/001673 on Mar. 10, 2011, now Pat. No. 8,917,682.

(60) Provisional application No. 61/384,301, filed on Sep. 19, 2010, provisional application No. 61/374,588, filed on Aug. 17, 2010, provisional application No. 61/367,857, filed on Jul. 26, 2010, provisional application No. 61/312,640, filed on Mar. 10, 2010.

(51) Int. Cl.
  *H04W 72/08* (2009.01)
  *H04W 56/00* (2009.01)
  *H04W 74/08* (2009.01)
  *H04W 76/04* (2009.01)

(52) U.S. Cl.
  CPC ..... *H04W 72/087* (2013.01); *H04W 74/0833* (2013.01); *H04W 76/048* (2013.01)

(56) References Cited

U.S. PATENT DOCUMENTS

| | | | |
|---|---|---|---|
| 2010/0216479 A1* | 8/2010 | Kato | H04W 74/002 455/450 |
| 2010/0232373 A1* | 9/2010 | Nory | H04W 72/1289 370/329 |
| 2011/0128907 A1 | 6/2011 | Kvernvik | |
| 2012/0172048 A1* | 7/2012 | Kato | H04L 5/0007 455/450 |

OTHER PUBLICATIONS

LG Electronics, "UL control channel design to support carrier aggregation," 3GPP TSG RAN WG1 #56bis, R1-091204, Seoul, Korea, Mar. 23-27, 2009, 6 pages.

* cited by examiner

\* The specific DL carrier is indicated using time information related to channel quality information (request).

FIG. 12
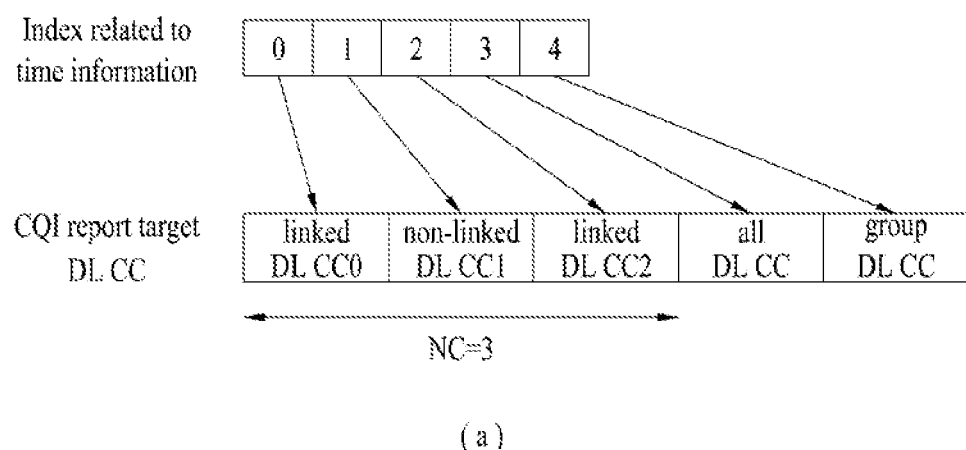
(a)
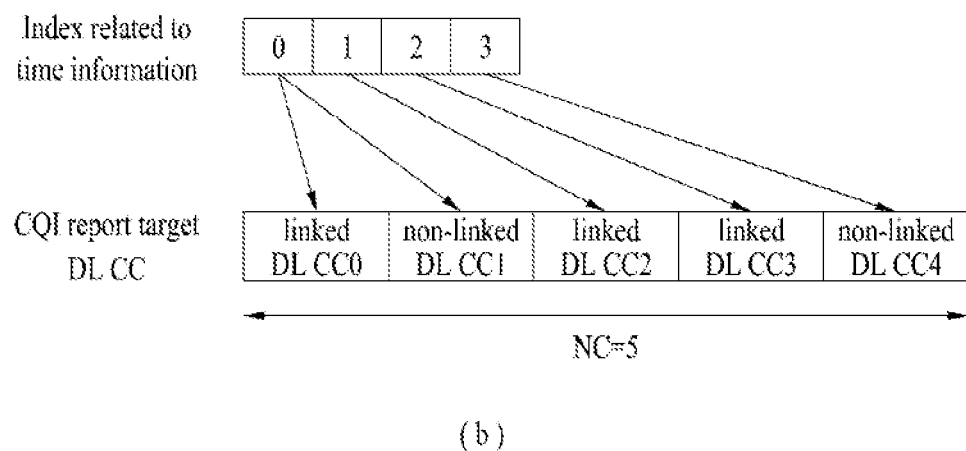
(b)

* DL carrier becoming target of channel quality information is determined depending on whether condition 'CQI request only' is met.

METHOD AND DEVICE FOR SIGNALING CONTROL INFORMATION IN CARRIER AGGREGATION SYSTEM

CROSS-REFERENCE TO RELATED APPLICATIONS

This Application is a Continuation of co-pending U.S. patent application Ser. No. 14/543,525 filed on Nov. 17, 2014, which is a Continuation of U.S. patent application Ser. No. 13/583,448 filed on Sep. 7, 2012 (now U.S. Pat. No. 8,917,682 issued on Dec. 23, 2014), which is filed as the National Phase of PCT/KR2011/001673 filed on Mar. 10, 2011, which claims the benefit under 35 U.S.C. § 119(e) to U.S. Provisional Application Nos. 61/384,301 filed on Sep. 19, 2010, 61/374,588 filed on Aug. 17, 2010, 61/367,857 filed on Jul. 26, 2010, and 61/312,640 filed on Mar. 10, 2010, all of which are hereby expressly incorporated by reference into the present application.

BACKGROUND OF THE INVENTION

Field of the Invention

The present invention relates to a wireless communication, and more particularly, to a method and apparatus for transmitting channel quality information.

Discussion of the Related Art

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

SUMMARY OF THE INVENTION

One object of the present invention is to provide a method and apparatus for efficiently performing signaling in a carrier aggregation system. In particular, the object of the present invention is to provide a method and apparatus for efficiently signaling a control command for an individual CC and a control command for all CCs in a carrier aggregation system. In more particular, the object of the present invention is to provide a method and apparatus for efficiently transmitting channel quality information on a downlink in a carrier aggregation system.

Technical tasks obtainable from the present invention are non-limited the above-mentioned technical task. And, other unmentioned technical tasks can be clearly understood from the following description by those having ordinary skill in the technical field to which the present invention pertains.

To achieve these and other advantages and in accordance with the purpose of the present invention, as embodied and broadly described, a method of transmitting channel quality information, which is transmitted by a user equipment in a wireless communication system using multiple carriers, according to one embodiment of the present invention may include the steps of receiving a control channel including channel quality information request, generating the channel quality information on at least one specific DL carrier among a plurality of DL carriers after receiving the control channel, and transmitting the channel quality information via a shared channel, wherein the at least one specific DL carrier is indicated using time information related to a reception of the channel quality information request or a transmission of the channel quality information.

To further achieve these and other advantages and in accordance with the purpose of the present invention, a user equipment, which is configured to transmit channel quality information in a wireless communication system using multiple carriers, according to another embodiment of the present invention may include an RF (radio frequency) unit and a processor configured to receive a control channel including channel quality information request, the processor configured to create the channel quality information on at least one specific DL carrier among a plurality of DL carriers after receiving the control channel, the processor configured to transmit the channel quality information via a shared channel, wherein the at least one specific DL carrier is indicated using time information related to a reception of the channel quality information request or a transmission of the channel quality information.

Preferably, the time information related to the reception of the channel quality information may include a subframe number for a base station to transmit the channel quality information request or for the user equipment to receive the channel quality information request, a system frame number or a combination of the subframe number and the system frame number.

Preferably, the time information related to the transmission of the channel quality information may include a subframe number for the user equipment to transmit the channel quality information, a system frame number or a combination of the subframe number and the system frame number.

Preferably, an index indicating the at least one specific DL carrier may be linked with modulo (X, Y), the X may be an index associated with the time information, the Y may be the number of aggregated carriers, and the modulo (X, Y) may indicate a remainder resulting from dividing the X by the Y.

Preferably, the channel quality information may include at least one of CQI (Channel Quality Indicator), PMI (Precoding Matrix Indicator) and RI (Rank Indicator).

Preferably, the control channel may further include carrier indication information.

Preferably, the control channel may include PDCCH (Physical Downlink Control Channel) and the shared channel may include PDSCH (Physical Downlink Shared Channel).

According to embodiments of the present invention, uplink (UL) control information can be efficiently transmitted in a wireless communication system. In particular, in a situation that a plurality of carriers are aggregated together, control information related to a UL channel can be efficiently transmitted.

According to embodiments of the present invention, the present invention may be able to efficiently perform signaling in a carrier aggregation system. In particular, the present invention may be able to efficiently signal a control command for an individual CC and a control command for all CCs in a carrier aggregation system. In more particular, the present invention may be able to efficiently transmit channel quality information on a downlink in a carrier aggregation system.

The present invention proposes a method of signaling a control command for an individual CC and a control command for all CCs in a system having various CCS exist therein.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIGS. 11 to 15 show examples of transmitting CQI aperiodically according to another embodiment of the present invention.

DETAILED DESCRIPTION OF THE EMBODIMENTS

First of all, the following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in DL and SC-FDMA in UL. And, LTE-A (LTE-Advanced) is an evolved version of 3GPP LTE.

For clarity, the following description mainly concerns 3GPP LTE/LTE-A, by which the present invention may be non-limited.

Figure 1:
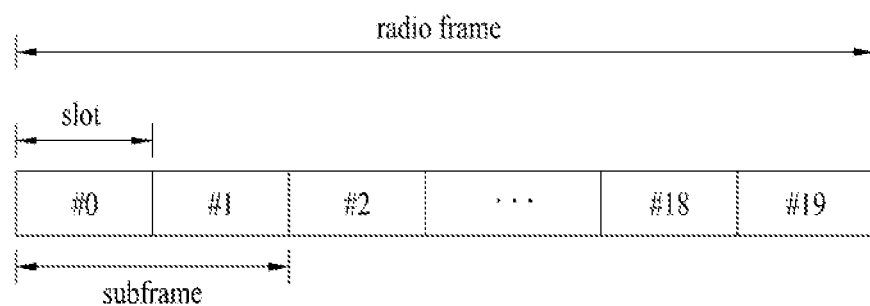
FIG. 1 is a diagram for one example of a structure of a radio frame used in E-UMTS system.

FIG. 1 is a diagram for one example of a structure of a radio frame used by E-UMTS system.

Referring to FIG. 1, an E-UMTS system uses a radio frame of 10 ms. And, one radio frame includes 10 subframes. Each of the subframes includes 2 slots contiguous with each other. One slot may have a length of 0.5 ms and may be constructed with a plurality of symbols (e.g., OFDM (orthogonal frequency division multiplexing) symbols, SC-FDMA (single carrier frequency division multiple access) symbols).

Figure 2:
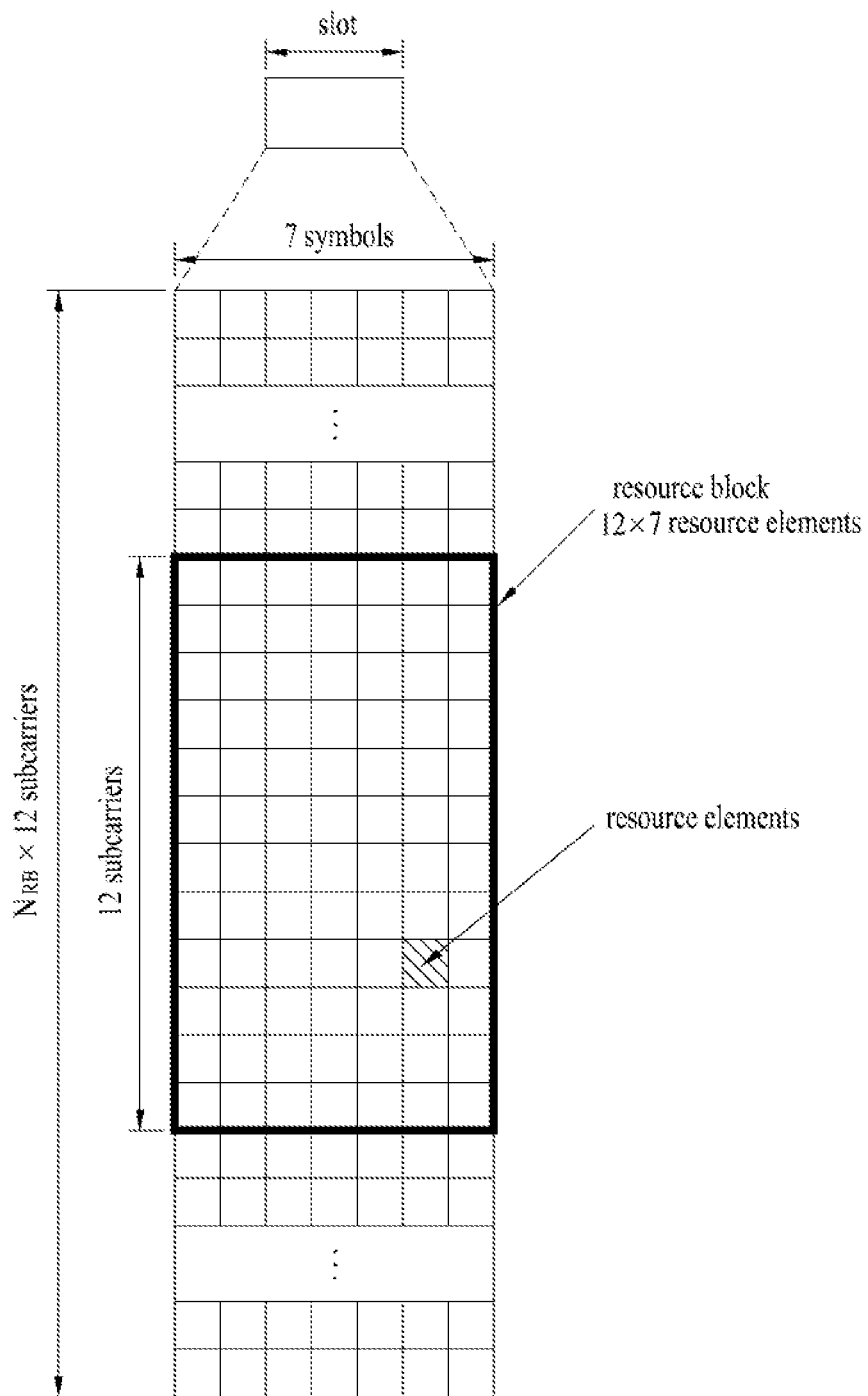
FIG. 2 is a diagram for one example of a resource grid of a radio frame.

FIG. 2 is a diagram for one example of a resource grid of a lot.

Figure 3:
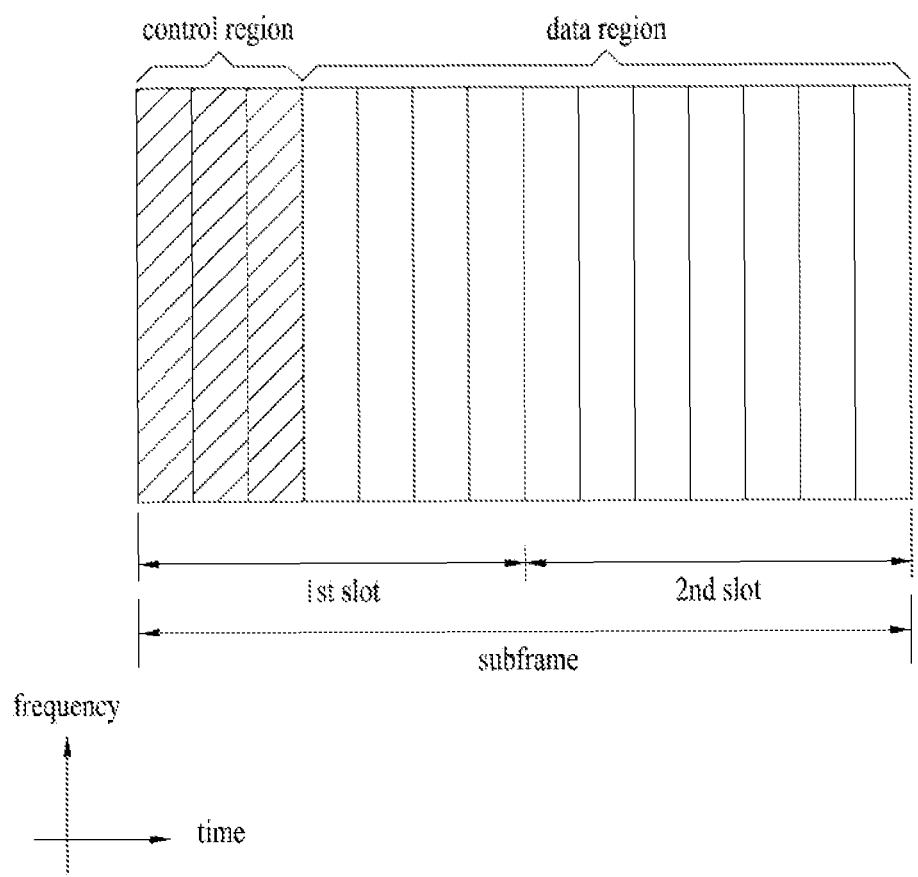
FIG. 3 is a diagram for a structure of a downlink (hereinafter abbreviated DL) subframe.

Referring to FIG. 2, a slot includes a plurality of OFDM symbols or SC-FDMA symbols and also includes a plurality of resource blocks (RBs) in frequency domain. On resource block includes 12×6 or 12×7 resource elements (REs). The number $N_{RB}$ of RBs included in a time slot depends on a transmission bandwidth configured in a cell. Each box in the resource grid indicates a minimum resource defined by one symbol and one subcarrier, which is called a resource element (RE). FIG. 3 exemplarily shows that a time slot and a resource block include 7 symbols and 12 subcarriers, respectively, by which the present invention may be non-limited. For instance, the number of symbols included in a slot may be variable depending on a length of a cyclic prefix (hereinafter abbreviated CP).

FIG. 3 is a diagram for a structure of a DL subframe.

Referring to FIG. 3, in a DL subframe of LTE system, L1/L2 control region and data region are multiplexed together by TDM (time division multiplexing). The L1/L2 control region is configured with $1^{st}$ n (e.g., 3, 4, etc.) OFDM symbols of a subframe and the rest of the OFDM symbols are used as the data region. The L1/L2 control region includes PDCCH (physical downlink control channel) configured to carry DL control information and the data region includes PDSCH (physical downlink shared channel) as a DL data channel. In order to receive a DL signal, a user equipment reads DL scheduling information from PDCCH and then receives DL data on PDSCH using resource allocation information indicated by the DL scheduling information. The resource (i.e., PDSCH) scheduled for the user equipment is allocated by a resource block unit or a resource block group unit.

PDCCH informs a user equipment of information related to resource allocation of transport channels PCH (paging channel) and DL-SCH (downlink-shared channel), UL scheduling grant, HARQ information and the like. The information carried on PDCCH is commonly called control information (DCI). In accordance with control information, there are various kinds of DCI formats.

Table 1 shows DCI format 0 for UL scheduling.

TABLE 1

| Field | Bits | Comment |
|---|---|---|
| Format | 1 | Uplink grant or downlink assignment |
| Hopping flag | 1 | Frequency hopping on/off |
| RB assignment | 7[a] | Resource block assigned for PUSCH |
| MCS | 5 | Modulation scheme, coding scheme, etc. |
| New Data Indicator | 1 | Toggled for each new transport block |
| TPC | 2 | Power control of PUSCH |
| Cyclic shift for DMRS | 3 | Cyclic shift of demodulation reference signal |

TABLE 1-continued

| Field | Bits | Comment |
|---|---|---|
| CQI request | 1 | To request CQI feedback through PUSCH |
| RNTI/CRC | 16 | 16 bit RNTI implicitly encoded in CRC |
| Padding | 1 | To ensure format 0 matches format 1A in size |
| Total | 38 | — |

MCS: Modulation and Coding Scheme
TPC: Transmit Power Control
RNTI: Radio Network Temporary Identifier)
CRC: Cyclic Redundancy Check It may be able to identify whether PDCCH s transmitted to a specific user equipment using RNTI. For instance, assume that PDCCH is CRC masked with RNTI named A and that the PDCCH carries UL resource allocation information B (e.g., frequency position) and transmission format information C (e.g., transport block size, modulation scheme, coding information, etc.). In this case, a user equipment in a cell monitors PDCCH using RNTI of its own and the user equipment having the RNTI A performs a UL transmission in accordance with the informations B and C obtained from the PDCCH.

Figure 4:
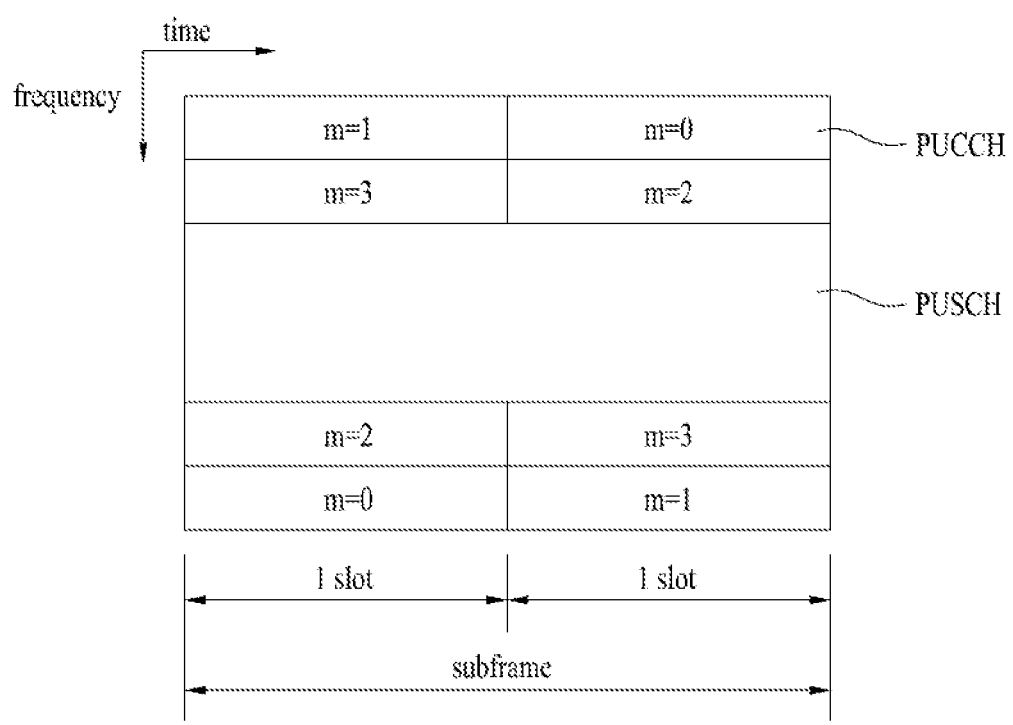
FIG. 4 is a diagram for one example of a structure of an uplink (hereinafter abbreviated UL) subframe.

FIG. 4 is a diagram for one example of a structure of a UL subframe used by LTE.

Referring to FIG. 4, a UL frame includes a plurality of slots (e.g., 2 slots). Each of the slots may include a different number of SC-FDMA symbols in accordance with a CP length. The UL subframe may be divided into a data region and a control region in frequency domain. The data region includes PUSCH and is used to transmit such a data signal as an audio and the like. The control region includes PUCCH and is used to transmit UL control information (UCI). The PUCCH includes an RB pair situated at both ends of the data region and performs hopping over the boundary of a slot. The UL control information includes SR (scheduling request) to request an uplink resource, HARQ ACK/NACK (hybrid automatic repeat and request acknowledgement/negative acknowledgement) for DL data packet, DL channel information and the like. In particular, the DL channel information may include PMI (precoding matrix indicator), RI (rank indicator) and CQI (channel quality indicator).

Channel Quality Indicator (CQI)

For an efficient communication, it may be necessary to indicate channel information by feedback. To this end, DL channel information is transmitted in UL and UL channel information is transmitted in DL. This channel information may be called a channel quality indicator (hereinafter abbreviated CQI). The CQI may be created in various ways. In this specification, the CQI may represent channel state information, and more particularly, CQI, PMI, RI or a combination thereof unless mentioned especially.

For instance, the CQI may be created by one of a method of quantizing a channel state (or, spectrum efficiency) and then indicating the quantized channel state, a method of calculating SINR and then indicating the calculated SINR, a method of indicating a state of actually applying a channel like MCS (modulation and coding scheme) and the like.

Among the CQI generating methods mentioned in the above description, it may frequently occur that the CQI is crated on the basis of MCS. This method is described in detail as follows. First of all, there is a CQI creation for a transmission scheme such as HSPDA in 3GPP or the like. If the CAI is created on the basis of the MCS, since the MCS includes a modulation scheme, a coding scheme, a corresponding coding rate and the like, if the modulation scheme and/or the coding scheme changes, the CQI should change correspondingly. Hence, at least one CQI is necessary per codeword.

Table 2 shows one example of a case of generating CQI by MCS.

TABLE 2

| CQI index | modulation | code rate × 1024 | Efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

In case that MIMO is applied to a system, the number of the required CQIs changes. Since MIMO system generates multi-channels using multi-antenna, several codewords are available. Hence, it may be necessary to use several CQIs. In case that a plurality of CQIs are used, a size of corresponding control information proportionally increases.

Figure 5:
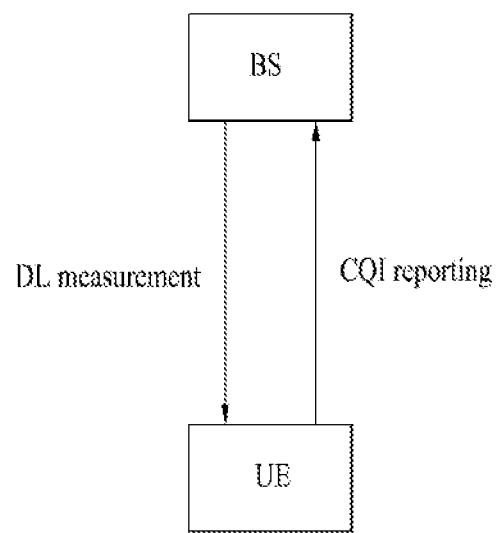
FIG. 5 and FIG. 6 are diagrams for examples of CQI creation and transmission.

FIG. 5 is a conceptional diagram for one example of CQI creation and transmission. First of all, a wireless communication system may use link adaptation in order to use a given channel capacity to the maximum. The link adaptation adjusts MCS (modulation and coding scheme) and transmit power in accordance with a given channel. To this end, a user should feed back channel quality information to a base station eventually.

Referring to FIG. 5, a user equipment measures a DL quality and then reports a CQI value, which is selected based on the measured DL quality, to a base station on a UL control channel. Subsequently, the base station performs a DL scheduling (e.g., user equipment selection, resource allocation, etc.) in accordance with the reported CQI value. In particular, the CQI value may include one of SINR (Signal to Interference and Noise Ratio), CINR (Carrier to Interference and Noise Ratio), BER (Bit Error Rate) and FER (Frame Error Rate) of a channel or a value resulting from converting one of SINR, CINR, BER and FER to a transmittable data. In case of MIMO system, RI (Rank Information), PMI (Precoding Matrix Information) or the like may be added as information that reflects a channel state. For instance, after a user equipment has observed time/frequency interval, it may be able to use a largest value among CQI indexes shown in Table 2, which meet the following condition, as a CQI value to report in a UL subframe n.

Condition: Transport block error probability does not exceed 0.1 if a single PDSCH transport block is received via a resource block (CQI reference resource) related to a CQI index with a combination of a modulation scheme corresponding to the CQI index and a transport block size.

If a frequency band used by a wireless communication system exceeds a coherence bandwidth, a channel abruptly varies within the corresponding bandwidth. In particular, since a plurality of subcarriers exist within a given bandwidth in a multicarrier system (e.g., OFDM system) and a modulated symbol is carried on each of the subcarriers, it may be able to transmit a channel on each subcarrier. Hence, in a multicarrier system using a plurality of subcarriers, a feedback size of channel information may increase abruptly. In order to reduce a waste of control signal (i.e., control overhead), various methods have been proposed.

In order to reduce the control overhead, a method of decreasing an information size of a channel quality indicator is schematically described as follows.

First of all, it may be able to reduce an information size of a channel quality indicator by changing a channel information transmission unit. For instance, in OFDM system, channel information may be transmitted by a subcarrier group unit instead of a subcarrier unit. If 12 subcarriers are combined together into one subcarrier group in OFDM system using 2,048 subcarriers, total 171 subcarrier groups are formed. Hence, a size of actually transmitted channel information is reduced down to 171 from 2,048.

In this specification, when a frequency band is configured with a plurality of subcarriers like OFDM, if CQI is reported by a subcarrier unit, a basic unit for CQI creation is defined as CQI subcarrier group or CQI subband. Meanwhile, in case that a frequency band is not divided into subcarriers or the like, a whole frequency band is divided into partial frequency bands and CQI can be then created with reference to the divided frequency band. In this case, the frequency band divided for the CQI creation is defined as a CQI subband.

Secondly, by compressing channel information, it may be able to reduce an information size of a channel quality indicator. For instance, in OFDM scheme, channel information of each subcarrier is compressed and transmitted. This compression scheme may include DCT (discrete cosine transform) for example.

Thirdly, by selecting a frequency band (e.g., CQI subband) for generating channel information, it may be able to reduce an information size of a channel quality indicator. For instance, instead of transmitting channel information on all subcarriers in OFDM scheme, it may be able to use a scheme (i.e., M scheme) of transmitting channel information by selecting M subcarriers or M subcarrier groups. According to the M scheme, M frequency bands having best channel quality are selected [Best-M scheme] or M frequency bands preferred by a base station and/or a user equipment are selected according to a prescribed reason [Preferred-M scheme]. The preferred-M scheme may include the best-M scheme. When CQI is selected by selecting a frequency band, actually transmitted information can be mainly divided into two parts. In particular, the $1^{st}$ part is a CQI value part and the $2^{nd}$ part is a CQI index part. For clarity of the following description, the best-M scheme is used as a representative example of the M scheme unless mentioned differently.

Figure 6:
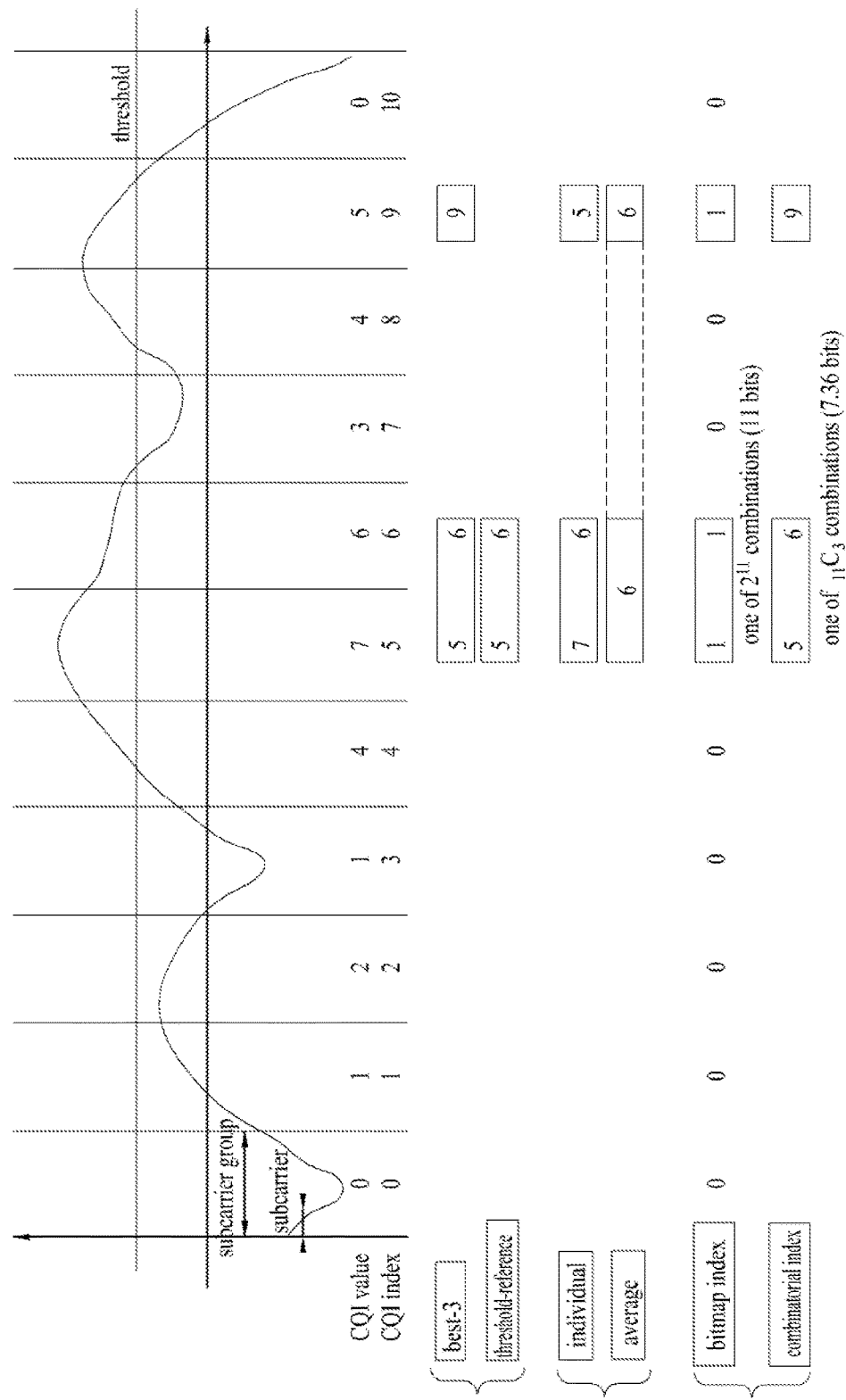

FIG. 6 shows a method of generating CQI by selecting CQI subband from a frequency domain. Frequency band selective CQI scheme is mainly configured with 3 parts. First of all, a user equipment selects a frequency band (i.e., CQI subband) to create CQI. Secondly, the user equipment creates and transmits CQI by manipulating channel information of the selected frequency bands. Thirdly, the user equipment transmits identification information (e.g., subband index) on the selected frequency band. The above-mentioned parts are discriminated for convenience, orders of the above-mentioned parts are changeable, and at least two of the above-mentioned parts may merge into one. The above-mentioned parts are described in detail as follows.

The CQI subband selecting method includes a best-M scheme and a threshold-based scheme. The best-M scheme is a scheme of selecting M CQI subbands in good channel state. According to the best-M scheme, a user equipment selects CQI subbands of indexes #5, #6 and #9 using the best-3 scheme. Meanwhile, according to the threshold-based scheme, CQI subband having a channel state higher than a threshold is selected. According to the threshold-based scheme, a user equipment selects CQI subbands of indexes #5 and #6 each of which is higher than a threshold.

The CQI value generating and transmitting method includes an individual scheme and an average scheme. In particular, the individual scheme is a scheme of transmitting all CQI values of selected CQI subbands. Hence, according to the individual scheme, if the number of the selected CQI subbands increases, the number of CQI values to be transmitted increases. On the other hand, the average scheme transmits an average of CQI values of the selected CQI subbands. Hence, according to the average scheme, it is advantageous in that only one CQI value is transmitted irrespective of the number of the selected CQI subbands. Yet, since the average scheme transmits a CQI average value of several CQI subbands, it may have a reduced accuracy. In this case, the average value may include a simple arithmetic average or an average in consideration of channel capacity.

The CQI subband index transmitting method includes a bitmap index scheme and a general combinatorial scheme. According to the bitmap index scheme, 1 bit is assigned to each CQI subband. If the corresponding CQI subband is used, '1' is assigned to the corresponding bit. Otherwise, '0' is assigned to the corresponding bit. On the contrary, it may be able to set up a bit value. The bitmap index scheme needs the bit number amounting to total CQI subbands but may be able to always indicate CQI subbands via a predetermined number of bit(s) no matter how may CQI subbands are used. Meanwhile, the combinatorial index scheme determines how may CQI subbands will be used is determined and then maps every combination of a predetermined number of CQI subbands selected from total CQI subbands to a corresponding index. In particular, when total N CQI subbands exist, f M CQI subband indexes are used among the N CQI subbands, a total number of possible combinations can be represented as Formula 1.

$$_N C_M = \frac{N!(N-1)!}{M!} \qquad \text{[Formula 1]}$$

Hence, the bit number to represent the number of cases in accordance with Formula 12 may be determined by the following expression.

$$\lceil \log_2(_N C_M) \rceil = \left\lceil \log_2\left(\frac{N!(N-1)!}{M!}\right) \right\rceil \qquad \text{[Formula 2]}$$

Since the present example relates to a method of selecting 3 CQI subbands from total 11 CQI subbands, the number of possible cases is 165 (i.e., $_{11}C_3=165$) and the corresponding bit number is 8 bits ($2^7 \leq _{11}C_3 \leq 2^8$).

CQI increases the number f transmissions in various dimensions to cause more overhead.

First of all, regarding the increase of a CQI information size in a space dimension, in case that several codewords are transmitted via several layers in MIMO, several CQIs are necessary. For instance, in 3GPP LTE, maximum 2 codewords are available for MIMO and two CQIs are necessary. When a CQI is configured with 4 bits, if there are 2 codewords, total CQIs should be configured with 8 bits. As CQI is transmitted to every user supposed to be informed of a channel state, the increase of a CQI size may occupy most of parts in aspect of whole radio resources. Therefore, if the increase of the CQI size is minimized, it may be preferable in aspect of channel capacity.

Secondly, regarding the increase of a CQI information size in a frequency dimension, the former CQI mentioned in the above description corresponds to one frequency band only. If a receiving side notifies a CQI for a frequency band in a best channel state only and a transmitting side performs a service via the corresponding frequency band, CQI is necessary for one band only. Yet, since the above-described example is suitable for a single user environment but unsuitable for a multi-user environment, the demand for a more efficient method rises. A problem, which is caused in the course of scheduling in case of transmitting CQI on one preferred band only, is described in detail as follows. First of all, if frequency bands preferred by multiple users do not overlap with each other, there will be no problem. Yet, if several users simultaneously select a specific frequency band as a best channel environment, it may cause a problem that the rest of the users except the user selected by a base station are unable to use the corresponding frequency band. Hence, if each of the users transmits one preferred frequency band only, the opportunity for the unselected users to receive a service is basically blocked. In order to solve this problem and to obtain a multi-user diversity gain effectively, CQI transmission for several frequency bands is required. In case that CQI corresponding to several frequency bands is transmitted, a CQI transmission information size is increased by a quantity amounting to a selected frequency band. For instance, after 3 frequency bands have been selected in order of a good channel state, if CQIs and frequency band indicators for the selected 3 frequency bands are transmitted, a CQI transmission size increases three times and an addition transmission for an indicator indicating a selected frequency band is required.

Thirdly, it may be able to consider an increase of a CQI information size (e.g., the number of transmissions) in the dimension that considers both space and frequency. In particular, several CQIs are necessary for the space dimension. And, it may consider a case that several CQIs are necessary for the frequency dimension as well.

Fourthly, an increase of a CQI information size (e.g., the number of transmissions) may be taken into consideration in other dimensions. For instance, if CDMA (code division multiple access) is used, a signal strength, an interference quantity and the like may fluctuate per spreading code, whereby CQI information is required for each spreading code. Hence, it may be able to consider an increase of a CQI information size (e.g., the number of transmissions) in code dimension. And, an increase of a CQI information size in one of various dimensions can be taken into consideration.

In the above description, the cases of requiring several CQIs in various dimensions are explained. If several CQIs are necessary, it may be able to introduce the concept of a differential CQI (Delta CQI) to reduce a CQI transmission size. In particular, a reference CQI is normally transmitted but a difference from a reference CQI is transmitted for other CQIs. When several CQIs are represented by the differential scheme, the greater number of bits is assigned to a CQI reference value but the relatively smaller number of bits is assigned to a differential value, whereby a total transmission size of transmitted CQIs can be reduced.

Table 3 shows UL channel used for CQI transmission in LTE system.

TABLE 3

| Scheduling type | Periodic CQI transmission | Aperiodic CQI transmission |
| --- | --- | --- |
| Frequency non-selective | PUCCH | |
| Frequency selective | PUCCH | PUSCH |

Referring to Table 3, it may be able to transmit CQI by periods determined by a higher layer using PUCCH. Alternatively, it may be able to aperiodically transmit CQI using PUSCH if necessary for a scheduler. The case of the transmission on PUSCH is available for the frequency selective case only. In the following description, CQI transmission is explained in detail.

1) Aperiodic transmission of CQI on PUSCH

CQI may be aperiodically transmitted on PUCCH. Aperiodic PUSCH feedback scheme of CQI is performed in a manner that a base station notifies RB allocation for transmitting feedback information, modulation information and the like each time using UL grant control information like a normal UL data transmission. CQI may be transmitted on PUSCH individually or together with data information. In particular, if a request field is set to 1 in DCI format 0, a user equipment transmits CQI to a base station using an allocated PUSCH resource. Meanwhile, if field values of DCI format 0 meet prescribed conditions, a CQI request-only condition is met.

Table 4 partially shows DCI format 0 indicating an aperiodic PUSCH feedback in LTE. If a CQI request field, the number of physical resource blocks (PRBs) and $I_{MCS}$ indicating an MCS index in DCI format 0 are set to 1, 4 or less and 29, respectively, a user equipment transmits CQI only on PUSCH without data.

TABLE 4

| | bits | Value for aperiodic PUSCH Feedback |
| --- | --- | --- |
| RB assignment | 7 | PRB ≤4 |
| MCS | 5 | $I_{MCS}$ = 29 |
| CQI request | 1 | 1 |

Table 5 shows a mode in transmitting CQI on PUSCH. A mode shown in Table 5 is selected by a higher layer and all CQIs are transmitted in the same PUSCH subframe.

TABLE 5

| | | PMI Feedback Type | | |
| --- | --- | --- | --- | --- |
| | | No PMI | Single PMI | Multiple PMI |
| PUSCH CQI feedback type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | |

2) Aperiodic transmission of CQI on PUCCH

CQI is periodically transmitted on PUCCH. Yet, if there is a PUSCH transmission at the timing point of transmitting CQI periodically, the CQI may be transmitted on PUSCH. Table 6 shows a mode in transmitting CQI periodically. A user equipment creates and transmits CQI by one of the schemes in the modes defined in Table 6.

TABLE 6

|  |  | PMI Feedback Type | |
| --- | --- | --- | --- |
|  |  | No PMI | Single PMI |
| PUCCH CQI Feedback Type | Wideband (wideband CQI) | Mode 1-0 | Mode 1-1 |
|  | UE Selected (subband CQI) | Mode 2-0 | Mode 2-1 |

Four kinds of transmission types exist in accordance with transmission combinations of CQI PMI and RI.

Type 1: Transmit subband CQI of Mode 2-0 and subband CQI of Mode 2-1

Type 2: Transmit wideband CQI and PMI

Type 3: Transmit RI

Type 4: Transmit wideband CQI

When RI and wideband CQI/PMI are transmitted, they are transmitted in subframes differing from each other in periodicity and offset. If RI and CQI/PMI need to be transmitted in the same frame, the CQI/PMI may not be transmitted.

Uplink Power Control

In a cellular wireless communication system, a user equipment performs a transmission in a manner of raising a power by UL transmit power control (TPC) if a channel environment of a base station is not good. If the channel environment is good, the user equipment performs a transmission in a manner of lowering a power. For instance, if the channel environment is not good, the base station gives the user equipment a TPC command for raising a transmit power. If the channel environment is good, the base station gives the user equipment a TPC command for lowering a transmit power.

The UL transmission scheme in LTE is characterized in a single carrier property using SC-FDMA. In particular, SC-FDMA maintains PAPR (peak to average ratio) lower than that of OFDM, thereby enabling a power amplifier to be efficiently used. For the single carrier property, PUSCH, PUCCH and SRS (sounding reference signal) for UL channel measurement are not allowed to be simultaneously transmitted. In case that data and control signal need to be simultaneously transmitted, information supposed to e transmitted on PUCCH is multiplexed with data by piggyback in PUSCH region. When SRS is transmitted, SC-FDMA symbol for carrying the SRS is configured not to carry PUSCH or PUCCH. Power controls of PUSCH and PUCCH are independently performed.

UL ACK/NACK, which is primary information in uplink, is a response to a DL data reception. Generally, a resource for UL ACK/NACK transmission is linked to a resource used for DL scheduling. Therefore, a PUCCH power control signal including ACK/NACK is transmitted to a user equipment in a manner of being included in a DL control signal indicating DL scheduling information. On the other hand, a PUSCH power control signal is transmitted to a user equipment in a manner of being included in a DL control signal delivering scheduling information on PUSCH.

Random Access Procedure

Scheduling for UL transmission in LTE is enabled only if UL transmission timing of a user equipment is synchronized. A random access procedure is used for various usages. For instance, a random access procedure is performed in case of an initial network access, a handover, a data occurrence or the like. A user equipment may be able to obtain UL synchronization via the random access procedure. Once the UL synchronization is obtained, a base station may be able to allocate a resource for UL transmission to the corresponding user equipment. The random access procedure may be classified into a contention based procedure and a non-contention based procedure.

Figure 7:
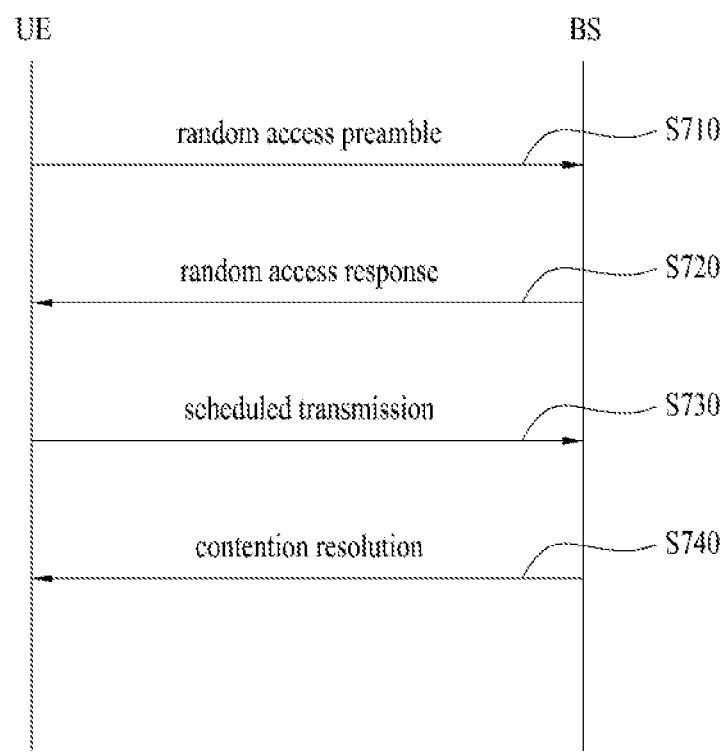
FIG. 7 and FIG. 8 are diagrams for examples of a random access procedure.

FIG. 7 is a diagram for one example of a contention based random access procedure.

Referring to FIG. 7, a user equipment receives information on a random access from a base station via system information. Thereafter, if the random access is required, the user equipment transmits a random access preamble (or a message 1) to the base station [S710]. Once the base station receives the random access preamble from the user equipment, the base station sends a random access response message (or, a message 2) to the user equipment [S720]. In particular, a DL scheduling information on the random access response message may be transmitted on L1/L2 control channel (PDCCH) by being CRC masked with RA-RNTI (random access-RNTI). Having received the RA-RNTI masked DL scheduling signal, the user equipment receives the random access response message on PDSCH and may be then able to decode the received random access response message. Subsequently, the user equipment checks whether a random access response information indicated to the user equipment is included in the received random access response message. In doing so, a presence or non-presence of the random access response information indicated to the user equipment may be checked in a manner of checking whether RAID (random access preamble ID) for the preamble having transmitted by the user equipment is present or not. The random access response information may include a timing advance indicating a timing offset information for synchronization, a radio resource allocation information on a resource used in UL, a temporary identifier (e.g., T-RNTI) for user equipment (UE) identification and the like. Once the random access response information is received, the user equipment sends a UL message (or, a message 3) on UL SCH (uplink shared channel) in accordance with the radio resource allocation information included in the received random access response information [S730]. Having received the UL message from the user equipment in the step S730, the base station sends a contention resolution message (or, a message 4) to the user equipment [S740].

Figure 8:
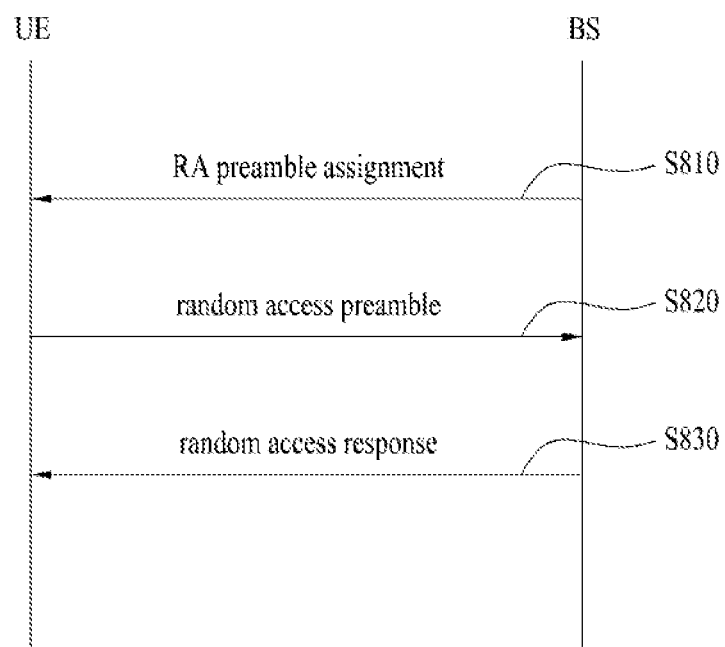

FIG. 8 is a diagram for one example of a non-contention based random access procedure. A non-contention based random access procedure may be used in a handover procedure or may exist if requested by an order given by a base station. A basic procedure is as good as a contention based random access procedure.

Referring to FIG. 8, a user equipment receives assignment of a random access preamble (i.e., a dedicated random access preamble) for the user equipment only from a base station [S810]. A dedicated random access preamble indication information (e.g., a preamble index) may be included in a handover command message or may be received on PDCCH. The user equipment transmits the dedicated random access preamble to the base station [S820]. Thereafter, the user equipment receives a random access response from the base station [S830] and the random access procedure is ended.

In order to indicate a non-contention based random access procedure with a PDCCH order, DCI format 1A is used. And, the DCI format 1A may be used for compact scheduling for one PDSCH codeword. The following information is transmitted using the DCI format 1A.

Flag for identifying DCI format 0 or DCI format 1A: This flag is 1-bit flag. A flag value '0' indicates DCI format 0 and a flag value 1 indicates DCI format 1A.

If all the fields remaining after scrambling CRC of DCI format 1A with C-RNTI are set as follows, the DCI format 1A may be used for a random access procedure according to a PDCCH order.

Localized/distributed VRB (virtual resource block) assignment flag: This flag is 1-bit flag. This flag is set to 0.

Resource block assignment information: $\lceil \log_2(N_{RB}^{DL}(N_{RB}^{DL}+1)/2) \rceil$. Every bit is set to 1.

Preamble index: 6 bits

PRACH mask index: 4 bits

All the remaining bits for compact scheduling of PDSCH in DCI format 1A are set to 0.

Multiple Component Carriers

In the legacy LTE, 1 component carrier (hereinafter abbreviated CC) exists in each of DL and UL. Since a single DL CC and a single UL CC exist, a TPC command information included in a control signal indicating a DL scheduling information or a CQI request information included in a control signal indicating a UL scheduling information may be recognized as a control information on a UL CC corresponding to a DL CC.

Figure 9:
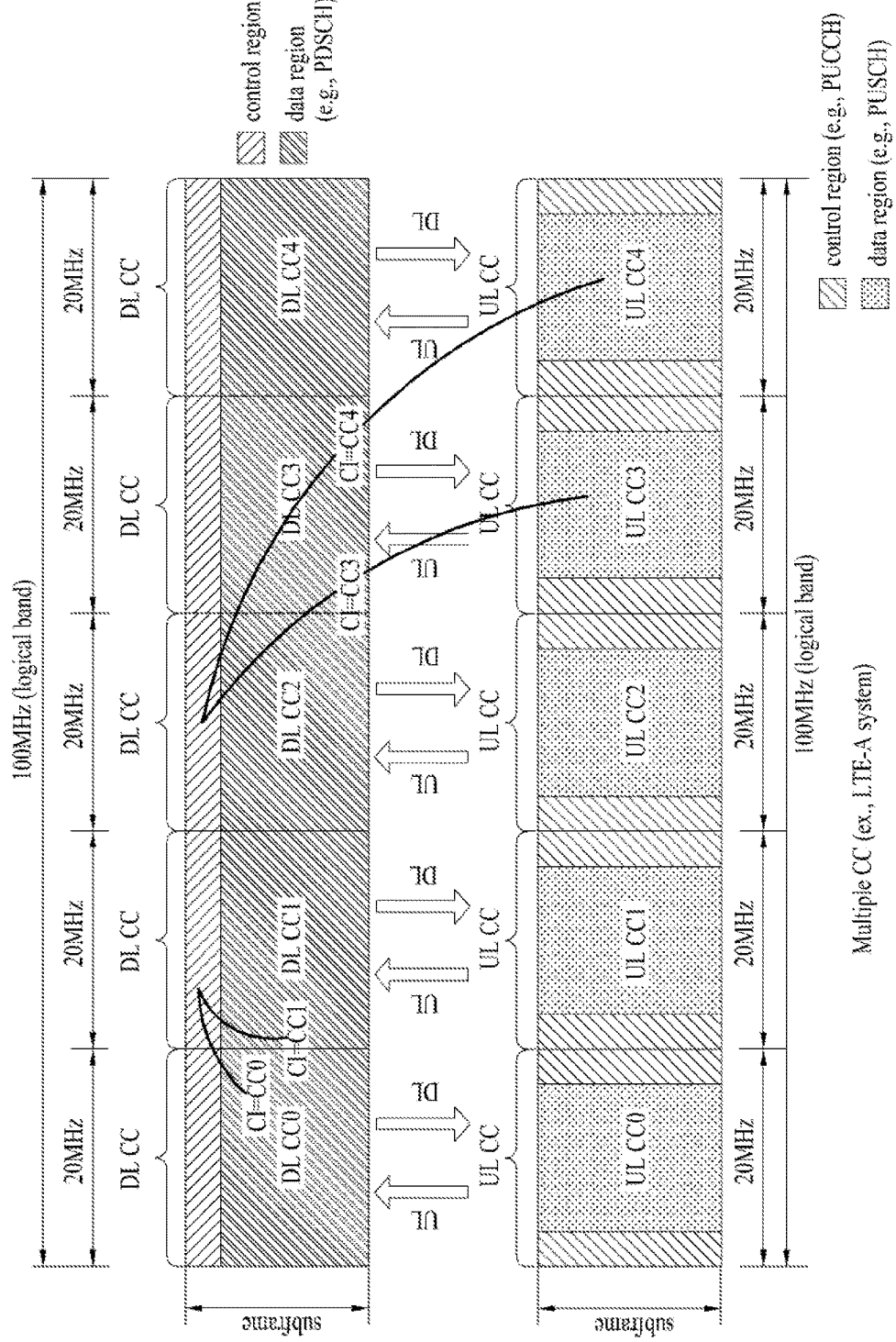
FIG. 9 shows a carrier aggregation (CA) communication system.

FIG. 9 shows one example of a carrier aggregation (CA) communication system. LTE-A aggregates a plurality of UL/DL CCs (uplink/downlink component carriers) to support wider UL/DL bandwidth. The terminology 'component carrier (CC)' may be substituted with such an equivalent terminology as a carrier, a cell and the like.

Referring to FIG. 9, CCs may be configured adjacent to or non-adjacent from each other. A bandwidth of each of the CCs may be determined independently. A link between DL CC and UL CC may be configured symmetric between a corresponding pair. Moreover, it is possible to configure an asymmetric carrier aggregation in which the number of UL CCs and the number of DL CCs are different from each other. For instance, if 2 DL CCs and 1 UL CC exist, a configuration in a 2:1 correspondence is enabled. The DL CC/UL CC link may be configured in a manner of being fixed to a system. Alternatively, the DL CC/UL CC link may be configured semi-statically. PDCCH may be transmitted via a control region of each DL CC. The PDCCH may be able to carry information for scheduling PDSCH belonging to the DL CC having the PDCCH belong thereto or information for scheduling PUSCH of the UL CC linked to the DL CC [self-carrier scheduling]. Moreover, the PDCCH may be able to carry information for scheduling PDSCH/PUSCH of DL/UL CC in a system irrespective of the DL CC having the PDCCH belong thereto or the UL CC linked to the corresponding DL CC [cross-carrier scheduling]. In case of the cross-carrier scheduling, it may be able to recognize a DL/UL CC becoming a scheduling target using a carrier indicator (CI). CI information is carried on CIF (carrier indicator field) of DCI. Moreover, control information may be configured to be transmitted or received on specific CC only. This specific CC may be named a primary CC (or, an anchor CC) and other CCS may be named secondary CCs.

Meanwhile, in case of a carrier aggregation system, since a plurality of DL CCs are present, it may be necessary to define whether a TPC command/CQI request included in a control signal (PDCCH) indicating DL/UL scheduling information is a control information on an individual CC or information applied to all CCs or a CC group including a plurality of CCs at a time.

In the following description, a method of efficiently signaling a control command for an individual CC and a control command for all CCs in a carrier aggregation system is explained with reference to the accompanying drawings.

1$^{st}$ Embodiment

When a scheduled CC is designated via CI, the present embodiment proposes that one or more CIF values are additionally configured for at least one specific CC. In doing so, one of CIF values configured for a specific CC may be used to assign a configuration command/information request signal for an individual CC and other CIF value may be used to assign configuration command/information request signals for a plurality of CCs. In this case, the configuration command/information request signal may include a TPC command/CQI request and the like. Moreover, a plurality of CCs may become all CCs of a system, all the aggregated CCs, or a specific CC group. If there are two or more CCs having a CIF value additionally assigned thereto, a plurality of CCs, to which the configuration command/information request signal will be applied, may be different per each of the CC(s) having the CIF value additionally assigned thereto. The mapping between CIF value and CC index, and the CC having the CIF value additionally configured therefor may be identically configured in every user equipment [UE-common configuration] or may be configured differently in each user equipment or each user equipment group [UE-specific configuration or UE group-specific configuration].

Figure 10:
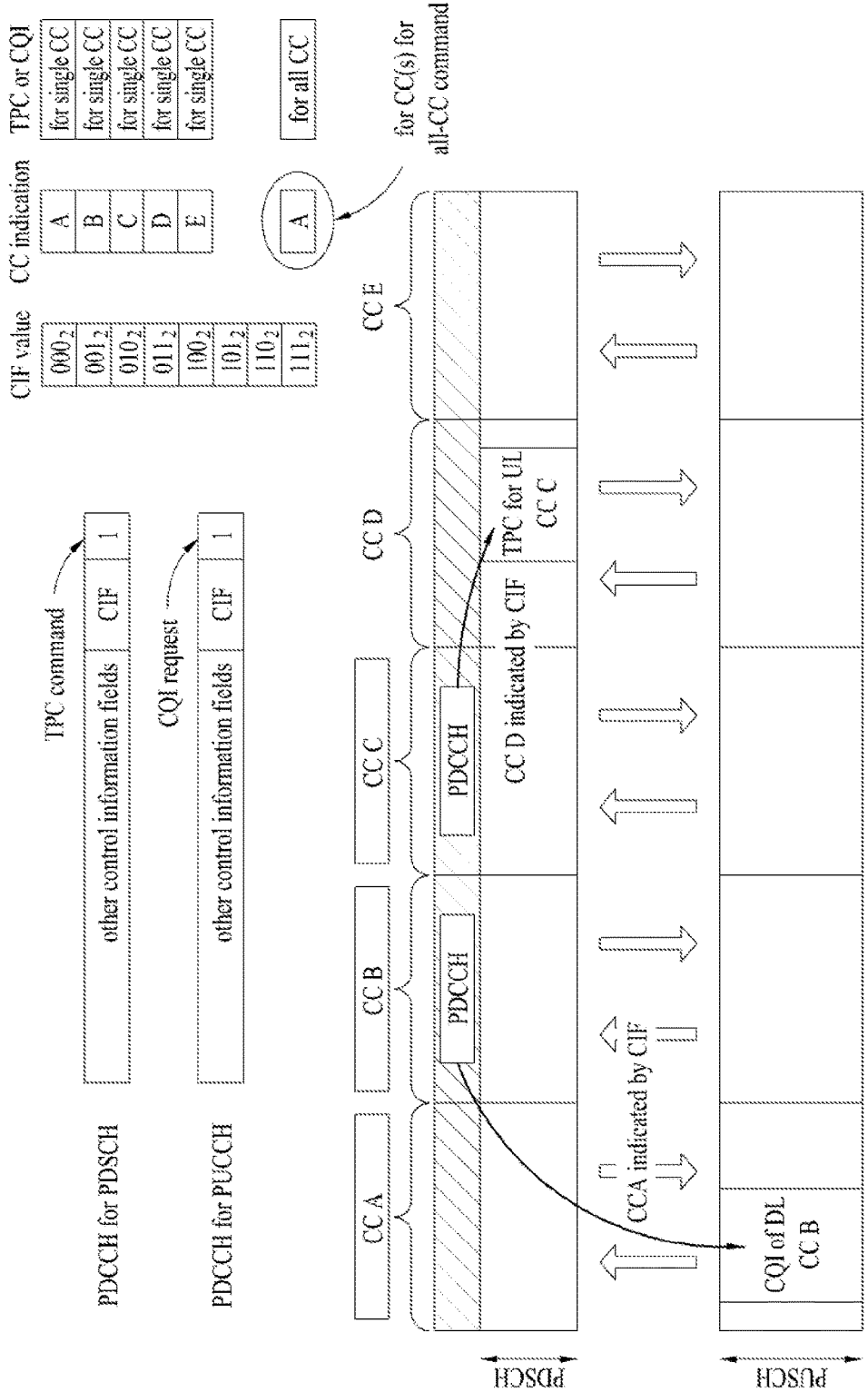
FIG. 10 is a diagram for one example of assigning a configuration command/information request signal according to one embodiment of the present invention.

FIG. 10 is a diagram for one example of assigning a configuration command/information request signal according to one embodiment of the present invention. In FIG. 10, CCs may be configured adjacent to or non-adjacent from each other. A bandwidth of each of the CCs may be determined independently. Moreover, it is possible to configure an asymmetric carrier aggregation in which the number of UL CCs and the number of DL CCs are different from each other.

Referring to FIG. 10, since the total number of CCs is 5, a CI field (CIF) of $\lceil \log_2 5 \rceil = 3$ bits are necessary to indicate CI information. According to the present example, CIF values (i.e., 0~4 (ObOO0, ObOO1, ObO10, ObO11)) represent CC A to CC E in sequence and the CIF value=7 (0b111) additionally represents the CC A. According to the present example, if CIF value=0~4, a TPC command or a CQI request may be recognized as a command for an individual CC. If CIF value=7, a TPC command or a CQI request is recognized as a command for a plurality of CCs (e.g., all CCs). According to the present example, in case of a configuration command/information request for an individual CC, it may be necessary to assign a CIF value per each CC. On the contrary, in case of a configuration command/information request for a plurality of CCs (e.g., all CCs), it may be unnecessary to assign a CIF value per CC. In particular, if a configuration command/information request for a plurality of CCs (e.g., all CCs) is transmitted together with scheduling information on a specific CC frequently allocated to a user equipment, it may be able to raise field configuration efficiency of a control signal for a signal delivery. According to the present example, a TCP command/CQI request for all CCs is assigned to only one of the remaining states. Yet, it may be able to assign a TPC command/CQI request for all CCs or different CC groups to two or more of the remaining states.

When a TPC command or a CQI request is applied to an individual CC, to which CC the TPC command or the CQI request is applied is described as follows.

In case that a configuration command is recognized as a command for a single CC, CC may be designated by the configuration command as follows.

TPC command for UL CC corresponding to DL CC indicated by a CI value of PDCCH containing DL scheduling information TPC command for UL CC corresponding to DL CC carrying PDCCH containing UL scheduling information TPC command for UL CC indicated by a CI value of PDCCH containing UL scheduling information CQI request for DL CC carrying PDCCH containing UL scheduling information CQI request for DL CC corresponding to UL CC indicated by a CI value of PDCCH containing UL scheduling information In this case, the indication of UL CC via CI may mean that a CI value directly indicates an index of UL CC. Alternatively, the indication of UL CC via CI may mean that a CI value firstly indicates an index of DL CC and that UL CC corresponding to the DL CC is then indicated.

2$^{nd}$ Embodiment

If a CQI request is made, CQI carried on UL CC may commonly agreed as channel information on DL CC corresponding to (i.e., linked to) the UL CC by a base station and a user equipment. Yet, there may exist a DL CC which is not configured with a linkage to UL CC for any reason(s). In this case, such a DL CC may be called a DL CC having not corresponding UL CC or a non-linked DL CC. For instance, if the number of DL CCs is greater than that of UL CCs, it may be unable to define a 1-to-1 linkage between UL CC and DL CC for all DL CCs. If so, since a CQI transmission for a non-linked DL CC is not available, the base station needs to inform the user equipment that a CQI for which DL CC needs to be transmitted. The non-linked DL CC may be generated by a DL/UL CC set configuration assigned by RRC (radio resource control) signaling for a cell deployment or a specific user equipment.

In the following description, a method of indicating a DL CC to which a CQI request is applied, in a situation of an asymmetric carrier aggregation having DL CCs more than UL CCs is explained with reference to the accompanying drawings. In particular, described is an example of a method for performing a CQI request for a non-linked DL CC using a PDCCH for scheduling a PUSCH. Although the following description is made in aspect of a user equipment, it is apparent that the same or corresponding operations may be performed by a base station.

Figure 11:
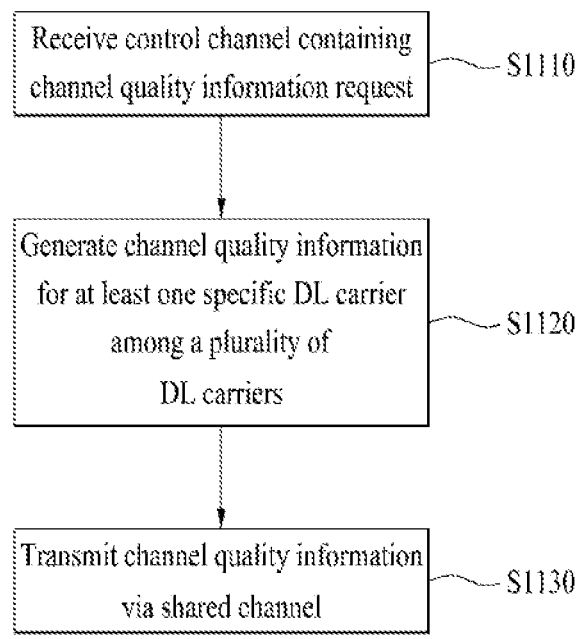

FIG. 11 shows one example of transmitting CQI aperiodically.

Referring to FIG. 11, a user equipment receives a control channel containing channel quality information request. In this case, the channel quality information request may include a CQI request and the control channel may include PDCCH. The channel quality information request may be included in DCI format 0 [S1110]. The user equipment then generates channel quality information for at least one specific DL carrier among a plurality of DL carriers (e.g., DL CCs) [S1120]. In this case, the channel quality information may include CQI, PMI, RI or any one of combinations thereof. Subsequently, the user equipment transmits the generated channel quality information via a shared channel [S1130]. In this case, the shared channel includes a PDSCH. And, the channel quality information may be transmitted with or without data.

According to the present example, the specific DL carrier in the step S1120 is indicated using time information related to the channel quality information (or request). In particular, the time information related to the channel quality information may include time information on a time for a base station to transmit channel quality information request to a user equipment, time information on a time for a user equipment to receive channel quality information request from a base station or time information on a time for a user equipment to transmit the generated channel quality information to a base station. In particular, according to the present example, the time information related to the channel quality information is linked with a DL carrier for which the channel quality information is supposed to be reported. In this case, one time information may be linked with one DL carrier or a plurality of DL carriers.

In particular, the user equipment may be able to determine DL CC, which becomes a CQI report target, using a subframe number (SN) for a base station to transmit a CQI request, a subframe number for receiving a CQI request command from a base station, a system frame number (SFN) corresponding to a corresponding subframe number, or a combination (SSN) of a corresponding subframe number and a system frame number (SFN). And, the user equipment may be able to determine DL CC, which becomes a CQI report target, using a subframe number, a system frame number, or a combination (SSN) of a subframe number and a system frame number for transmitting a CQI report. In case of LTE, a subframe index for transmitting a CQI is equal to a sum resulting from adding 4 to a subframe index for receiving a CQI request [i.e., CQI transmitted subframe index=(CQI request received subframe index) to 4], by which the present example may be non-limited. Alternatively, SSN may given as a form that contains 'A*SFN+ B*SN' (where, A and B are integers equal to or greater than 0). And, the system frame number may be corresponding to a radio frame number.

For example, when a user equipment aggregates total NC DL CCs, if a CQI request command is received, the user equipment may recognize DL CC, which is linked with an output value of Formula 3, as a CQI report target.

$$\text{modulo}(SN,NC), \text{modulo}(SFN,NC), \text{or modulo}(SSN, NC) \quad \text{[Formula 3]}$$

In Formula 3, modulo(X, Y) is a function of returning a remainder resulting from dividing X by Y. And, NC, SN, SFN and SSN are same as defined in the forgoing description.

In particular, a user equipment may be able to recognize DL CC, which has an output of Formula 3 as a CC index, as a CQI report target. And, the user equipment may be able to recognize DL CC, which has a CC index corresponding to a value obtained using an output value of Formula 3, as a CQI report target. In this case, the DL CC index may be determined in advance by broadcast/RRC signaling and the like.

This method may be applicable to all DL CCs irrespective of whether DL CC is configured to correspond to UL CC (i.e., whether DL CC is linked to UL CC in advance) or not. A DL CC set, to which the present method is applied, includes all DL CCs assigned to a user equipment or a portion of DL CCs designated by higher layer signaling (e.g., RRC signaling, etc.) only.

FIG. 12 shows one example of linking time information related to CQI (request) in the method shown in FIG. 11 to DL CC(s) of CQI report target.

Referring to FIG. 12, when a non-linked DL CC exists, a CQI linkage may be configured to enable a CQI request command to be recognized as a CQI request command for a plurality of DL CCs. For instance, Formula 3 may be modified into the following formula.

$$\text{modulo}(SN,NC+N), \text{modulo}(SFN,NC+N), \text{ or modulo}(SSN,NC+N) \quad \text{[Formula 4]}$$

In Formula 4, modulo(X, Y) is a function of returning a remainder resulting from dividing X by Y. And, NC, SN, SFN and SSN are same as defined in the forgoing description. Moreover, N is an integer equal to or greater than 0.

Referring to Formula 4, an output value of modulo function has a value of 0~(NC+N−1). In this case, the output value of 0~(NC−1) (e.g., 0, 1, 2) is used to recognize an individual DL CC as a CQI report target. And, an output value of NC~(NC+N−1) (e.g., 3, 4) may be used to recognize a plurality of DL CCs as a CQI report target. In this case, a plurality of the DL CCs may include a full DL CC set, an aggregated DL CC set, and a non-linked DL CC set.

Alternatively, Formula 3 may be modified into the following formula.

$$\text{modulo}(SN,NC-N), \text{modulo}(SFN,NC-N), \text{ or modulo}(SSN,NC-N) \quad \text{[Formula 5]}$$

In Formula 5, modulo(X, Y) is a function of returning a remainder resulting from dividing X by Y. And, NC, SN, SFN and SSN are same as defined in the forgoing description. Moreover, N is an integer equal to or greater than 0.

Referring to Formula 5, an output value of modulo function has a value of 0~(NC−N−1). Since the number of output values is smaller than the number of aggregated carriers, a portion of the output values may be overlappedly mapped to a plurality of DL CCs. Hence, a portion of the output values (e.g., 1, 2, 3) is used to recognize an individual DL CC as a CQI report target. And, the rest of the output value (e.g., 0) may be used to recognize a plurality of DL CCs as a CQI report target.

FIG. 11 and FIG. 12 show the time information related to CQI (request) to determine DL CC becoming a CQI report target, for clarity of the description of the invention. Optionally, it may be able to determine DL CC becoming a CQI report target using another parameter related to carrier aggregation in addition. For instance, in order to determine DL CC becoming a CQI report target, a DL CC index (CIF) for receiving a CQI request command or a UL CC index (CIF) for transmitting CQI may be used together. For instance, the corresponding DL CC index (CIF) or the corresponding UL CC index (CIF) may be used as an offset value.

Figure 13:
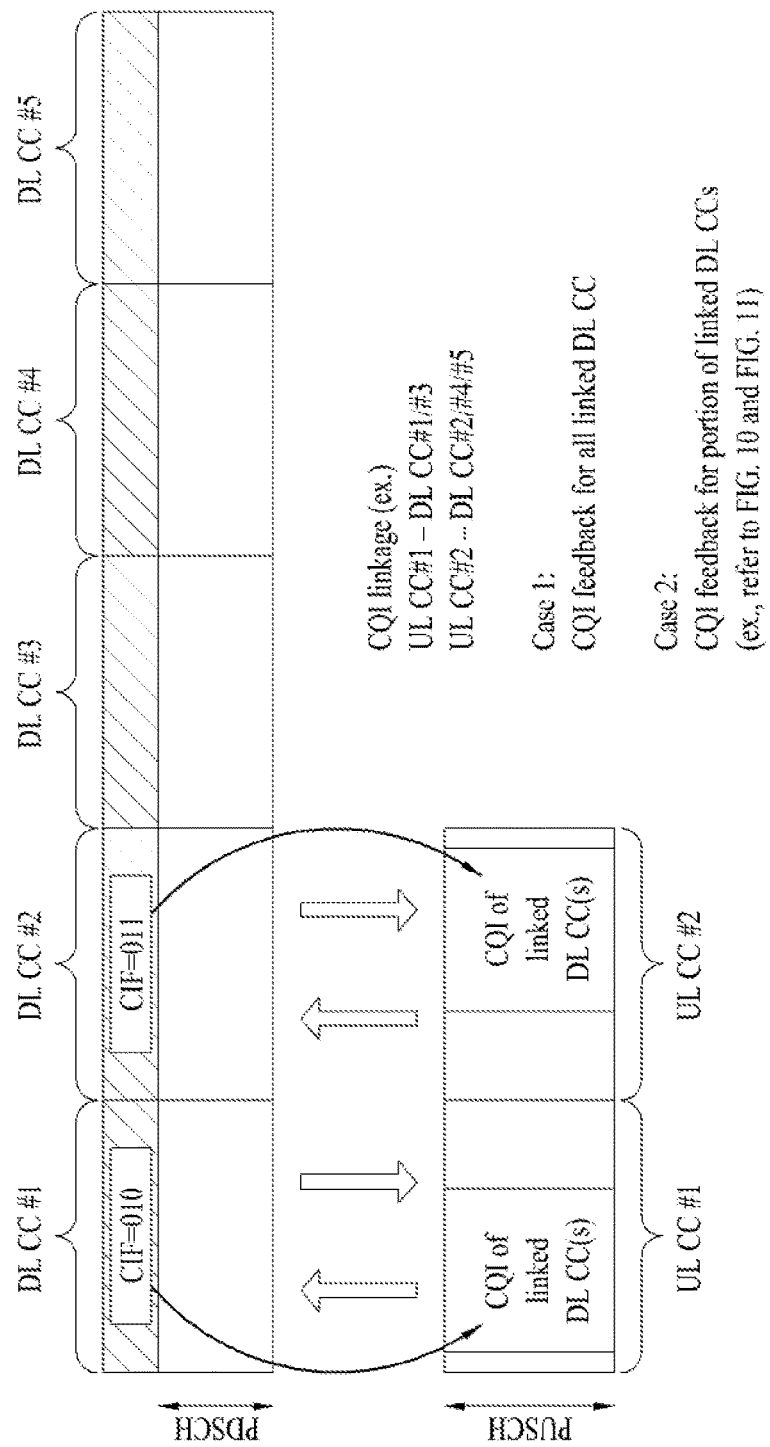

FIG. 13 shows another example of transmitting CQI aperiodically.

Referring to FIG. 13, when a non-linked DL CC exists, if a CQI request is received, it may be able to configure a CQI linkage so as to enable the CQI request to be recognized as a CQI request for a plurality of DL CCs. For instance, if DL CC #1/#2 is linked with UL CC #1/#2 and DL CC #3/#4/#5 is a non-linked DL CC, it may be able to configure a CQI linkage such that, in view of CQI transmission, the DL CC #3 and the DL CC #4/#5 are linked to the UL CC #1 and the UL CC #2, respectively. Hence, if a user equipment needs to transmit CQI on UL CC #1 in response to a CQI request, the user equipment recognizes both of the DL CC #1 and the DL CC #3 as CQI report targets and then performs CQI feedback. Similarly, if a user equipment needs to transmit CQI on UL CC #2 in response to a CQI request, the user equipment recognizes all the DL CCs #1, DL CC #4 and DL CC #5 as CQI report targets and then performs CQI feedback. In this case, the CQI linkage may be predetermined in advance via broadcast/RRC signaling or the like. And, a plurality of DL CCs (for clarity, named a CQI CC set) having CQI request command applied thereto may include one non-linked DL CC, a portion of non-linked DL CCs, or all non-linked DL CCs. The present example corresponds to a case that two CQI CC sets are configured. In accordance with an example of implementation, a CQI request command may apply to all DL CCs in a CQI CC set [i.e., Case 1] or a portion of DL CCs in a CQI CC set [i.e., Case 2]. Case 2 may be performed using the former method described with reference to FIG. 10 and FIG. 11, by which the example may be non-limited.

Figure 14:
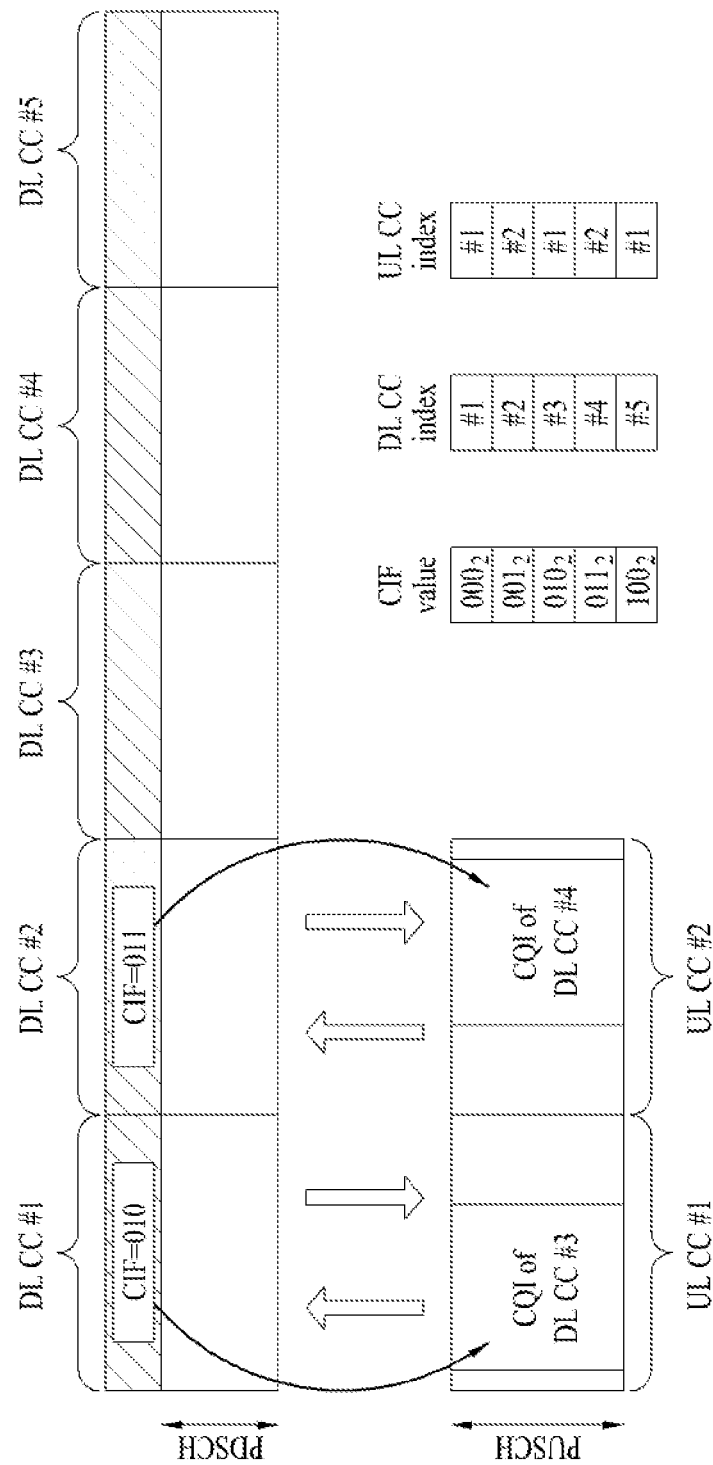

FIG. 14 shows another example of transmitting CQI aperiodically.

Referring to FIG. 14, a plurality of CIF values respectively indicating different DL CC indexes may overlap to indicate the same UL CC index. According to this method, if a plurality of CIF values in PDCCHs scheduling PUSCH to carry CQI are configured to indicate the same UL CC, it may be able to discriminate DL CCs, which become CQI report targets, using a plurality of different CIF values indicating the same UL CC. For instance, referring to FIG. 14, assume that 5 DL CCs and 2 UL CCs exist, that DL CC #1 and DL CC #2 correspond to UL CC #1 and UL CC #2, respectively, and that there is no UL CC(s) configured to correspond to DL CC #3, DL CC #4 and DL CC #5. On this assumption, CIF values indicating DL CC #1, DL CC #3 and DL CC #5, which correspond to odd-numbered indexes, may be configured to commonly indicate UL CC #1. And, CIF values indicating DL CC #2 and DL CC #4, which correspond to even-numbered indexes, may be configured to commonly indicate UL CC #2. Hence, if a user equipment receives a CQI request via a UL grant PDCCH set to 'CIF=0b010', a CQI for DL CC (i.e., DL CC #3) corresponding to 'CIF=0b010' is transmitted on UL CC (i.e., UL CC #1) corresponding to 'CIF=0b010'. Information on a CIF value having DL/UL CC indexes mapped thereto overlappedly may be defined through specific rule/function configured in advance between a base station and a user equipment or may be notified to a user equipment by a base station through RRC or L1/L2 signaling.

Figure 15:
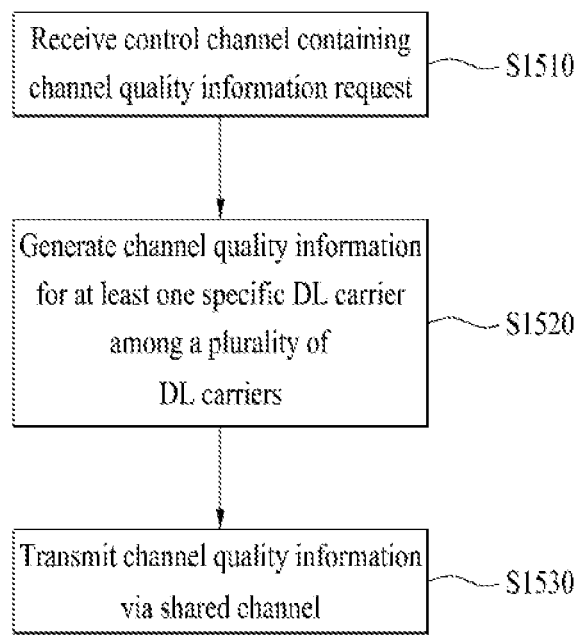

FIG. 15 shows another example of transmitting CQI aperiodically.

Referring to FIG. 15, a user equipment receives a control channel containing channel quality information request. In this case, the channel quality information request may include a CQI request and the control channel may include PDCCH. The channel quality information request may be included in DCI format 0 [S1510]. The user equipment then generates channel quality information on at least one specific DL carrier among a plurality of DL carriers (e.g., DL CCs) [S1520]. In this case, the channel quality information may include CQI, PMI, RI or one of combinations thereof. Subsequently, the user equipment transmits the generated channel quality information via a shared channel [S1530]. In this case, the shared channel includes a PDSCH. And, the channel quality information may be transmitted with or without data.

According to the present example, DL carrier becoming a CQI report target is determined depending on whether a CQI request only condition is met. In particular, according to this method, depending on whether field value(s) configuring a UL PUSCH grant PDCCH, of which CQI request command is activated (i.e., a CQI request bit is set to 1), meets a specific condition or not, a DL CC becoming a CQI report target may be differently indicated/recognized. For instance, if the field value(s) configuring PDCCH meets a condition 'CQI request only' (i.e., a condition for enabling a scheduled PUSCH to carry a CQI only without UL data (i.e., transport block for UL-SCH)), a user equipment may be able to indicate/recognize that a CQI only for a DL CC linked to a UL CC, on which PUSCH will be transmitted, is reported. On the contrary, if the corresponding field value(s) in the UL PUSCH grant PDCCH, of which CQI request command is activated, does not meet the condition 'CQI request only', the user equipment may report CQI for all DL CCs assigned to the user equipment or may indicate/recognize that CQI for DL CC group previously designated to UL CC, which will carry PUSCH, is reported [Alt 1]. In this case, the condition 'CQI request only' may include 'CQI request bit=1', '$I_{MCS}$=29', and 'number of RBs for PUSCH transmission is equal to or smaller than 4 (i.e., $N_{RB} \leq 4$)' [cf. Table 4]. Alternatively, the condition 'CQI request only' may include a condition newly defined in LTE-A. The proposal Alt 1 may be more suitable for a case that an upper limit of $N_{RB}$ (or, upper and lower limits of $N_{RB}$) for the condition 'CQI request only' is defined relatively small.

If the upper limit of $N_{RB}$ (or, upper and lower limits of $N_{RB}$) for the condition 'CQI request only' is defined relatively large in LTE-A, an operation opposite to the method Alt 1 may be more appropriate. For instance, if field value(s) configuring a UL PUSCH grant PDCCH (indicating a CQI request command) meets the condition 'CQI request only', it may be indicated/recognized that all CQIs for all DL CCs assigned to a user equipment or all CQIs for DL CC group previously designated to UL CC, on which PUSCH will be transmitted, are reported. On the contrary, if the corresponding field value(s) in the CQI request command activated UL PUSCH grant PDCCH does not meet the condition 'CQI request only', it may be indicated/recognized that CQI only for the DL CC linked to the UL CC, on which PUSCH will be transmitted is, reported [Alt 2]. Meanwhile, it may be possible to configure whether to apply the proposal Alt 1 or the proposal Alt 2 cell-specifically or UE-specifically (or, UE group-specifically).

3$^{rd}$ Embodiment

If UL timing synchronization is independently controlled per UL CC for a user equipment to which a plurality of UL CCs are assigned, a base station should independently adjust UL timing advance for each UL CC of the user equipment per UL CC. To this end, the base station should be able to give a command for RACH preamble transmission independently per UL CC using the former PDCCH order described with reference to FIG. 8. Meanwhile, due to some reasons, limitation may be put on DL CC on which the PDCCH order for initiating a random access can be carried. This may correspond to an asymmetric carrier aggregation situation in which the number of UL CCs is greater than that of DL CCs. Moreover, the PDCCH order for initiating a random access may be carried on specific DL CC (e.g., Primary CC) only due to such a reason as overhead reduction and the like. Hence, in order to indicate an RACH preamble transmission for a specific UL CC using a PDCCH order carried on one DL CC, it may be necessary to give the PDCCH order to inform on which UL CC a user equipment will transmit RACH preamble.

Therefore, the present embodiment proposes a method of configuring a CIF value, which is provided for a PDCCH order for performing an RACH preamble transmission command for UL CC, to directly indicate an index of UL CC on which a user equipment will transmit an RACH preamble. For instance, if an RACH preamble transmission command is transmitted using DCI format 1A, if each field in DCI format 1A is set to a PDCCH order for a random access, a user equipment may interpret a CIF value of the corresponding PDCCH as an index of UL CC on which an RACH preamble will be transmitted. Alternatively, it may be able to consider another method. Namely, a CIF value in PDCCH order is indicated by a DL CC index. And, a UL CC to carry an RACH preamble is interpreted as a UL CC corresponding to a corresponding DL CC. As mentioned in the foregoing description with reference to FIG. 14, it may be able to use CIF values configured to have DL/UL CC indexes mapped duplicatively.

Figure 16:
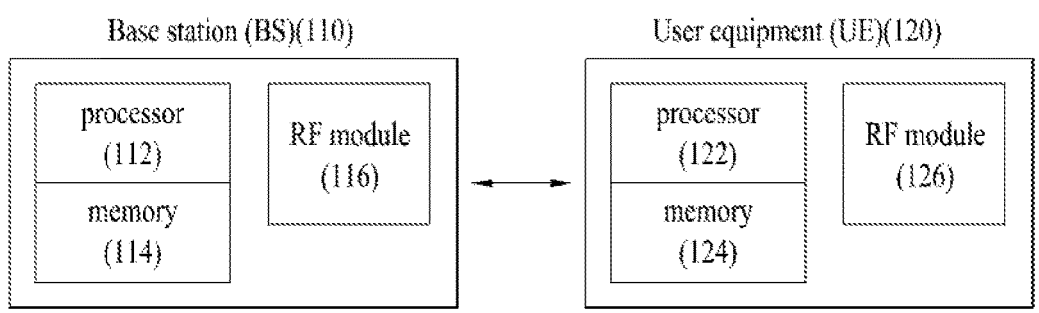
FIG. 16 is a diagram for one example of a base station and a user equipment applicable to the present invention.

FIG. 16 is a diagram for one example of a base station and a user equipment applicable to the present invention.

Referring to FIG. 16, a wireless communication system may include a base station (BS) 110 and a user equipment (UE) 120. In DL, a transmitter is a part of the base station 110 and a receiver is a part of the user equipment 120. In UL, a transmitter is a part of the user equipment 120 and a receiver is a part of the base station 110. The base station 110 may include a processor 112, a memory 114 and a radio frequency (RF) unit 116. The processor 112 may be configured to implement the procedures and/or methods proposed by the present invention. The memory 114 is connected with the processor 112 to store various kinds informations related to operations of the processor 112. The RF unit 116 is connected with the processor 112 and then transmits and/or receives radio signals. The user equipment 120 may include a processor 122, a memory 124 and a radio frequency (RF) unit 126. The processor 122 may be configured to implement the procedures and/or methods proposed by the present invention. The memory 124 is connected with the processor 122 to store various kinds informations related to operations of the processor 122. The RF unit 126 is connected with the processor 122 and then transmits and/or receives radio signals. The base station 110 and/or the user equipment 120 may have a single antenna or multiple antennas. Besides, the user equipment 120 may further include at least one of a power management module, a battery, a display, a keypad, a SIM card (optional), a speaker and a microphone [not shown in the drawing].

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, embodiments of the present invention are described centering on the data transmission/reception relations between a base station and a user equipment. In this disclosure, a specific operation explained as performed by a base station may be performed by an upper node of the base station in some cases. In particular, in a network constructed with a plurality of network nodes including a base station, it is apparent that various operations performed for communication with a user equipment may be performed by a base station or other networks (e.g., relay, etc.) except the base station. In this case, 'base station' can be replaced by such a terminology as a fixed station, a Node B, an eNode B (eNB), an access point and the like. And, 'terminal' may be replaced by such a terminology as a user equipment (UE), a mobile station (MS), a mobile subscriber station (MSS)' and the like.

Embodiments of the present invention may be implemented using various means. For instance, embodiments of the present invention may be implemented using hardware, firmware, software and/or any combinations thereof. In case of the implementation by hardware, one embodiment of the present invention may be implemented by one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor. The memory unit may be provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

Accordingly, the present invention is applicable to wireless access systems. In particular, the present invention is applicable to a method and apparatus for transmitting channel quality information in a wireless communication system.

What is claimed is:

1. A method of maintaining uplink synchronization at a user equipment in a wireless communication system supporting carrier aggregation, the method comprising:
   receiving a physical downlink control channel (PDCCH) order from a base station,
   wherein the PDCCH order indicates an initiation of a random access procedure with the base station, and
   wherein the PDCCH order includes a carrier indicator field and a predefined set of values of:
      a 1-bit flag indicating a localized/distributed resource block assignment, and
      a resource block assignment field; and
   transmitting a random access preamble to the base station through an uplink component carrier corresponding to a value of the carrier indicator field among a plurality of uplink component carriers configured between the user equipment and the base station.

2. The method of claim 1, wherein the PDCCH order includes a cyclic redundancy check (CRC) scrambled with a cell radio access network temporary identifier (C-RNTI).

3. The method of claim 1, wherein the 1-bit flag indicating the localized/distributed resource block assignment is set to 0, and all bits of the resource block assignment field are set to 1.

4. The method of claim 1, wherein the plurality of uplink component carriers have a plurality of uplink synchronization timings.

5. The method of claim 1, further comprising:
   receiving a random access response from the base station, the random access response including a timing advance (TA) command for the uplink component carrier in response to the random access preamble.

6. A method of maintaining uplink synchronization at a base station in a wireless communication system supporting carrier aggregation, the method comprising:
   transmitting a physical downlink control channel (PDCCH) order to a user equipment,
   wherein the PDCCH order indicates an initiation of a random access procedure with the base station, and
   wherein the PDCCH order includes a carrier indicator field and a predefined set of values of:
      a 1-bit flag indicating a localized/distributed resource block assignment, and
      a resource block assignment field; and
   receiving a random access preamble from the user equipment through an uplink component carrier corresponding to a value of the carrier indicator field among a plurality of uplink component carriers configured between the user equipment and the base station.

7. The method of claim 6, wherein the PDCCH order includes a cyclic redundancy check (CRC) scrambled with a cell radio access network temporary identifier (C-RNTI).

8. The method of claim 6, wherein the 1-bit flag indicating the localized/distributed resource block assignment is set to 0, and all bits of the resource block assignment field are set to 1.

9. The method of claim 6, wherein the plurality of uplink component carriers have a plurality of uplink synchronization timings.

10. The method of claim 6, further comprising:
    transmitting a random access response to the user equipment, the random access response including a timing advance (TA) command for the uplink component carrier in response to the random access preamble.

11. A user equipment configured to maintain uplink synchronization in a wireless communication system supporting carrier aggregation, the user equipment comprising:
    a radio frequency (RF) unit; and
    a processor configured to:
       receive a physical downlink control channel (PDCCH) order from a base station,
       wherein the PDCCH order indicates an initiation of a random access procedure with the base station, and
       wherein the PDCCH order includes a carrier indicator field and a predefined set of values of:

a 1-bit flag indicating a localized/distributed resource block assignment, and a resource block assignment field, and transmit a random access preamble to the base station through an uplink component carrier corresponding to a value of the carrier indicator field among a plurality of uplink component carriers configured between the user equipment and the base station.

12. The user equipment of claim 11, wherein the PDCCH order includes a cyclic redundancy check (CRC) scrambled with a cell radio access network temporary identifier (C-RNTI).

13. The user equipment of claim 11, wherein the 1-bit flag indicating the localized/distributed resource block assignment is set to 0, and all bits of the resource block assignment field are set to 1.

14. The user equipment of claim 11, wherein the plurality of uplink component carriers have a plurality of uplink synchronization timings.

15. The user equipment of claim 11, wherein the processor is further configured to receive a random access response from the base station, and the random access response includes a timing advance (TA) command for the uplink component carrier in response to the random access preamble.

16. A base station configured to maintain uplink synchronization in a wireless communication system supporting carrier aggregation, the base station comprising:

a radio frequency (RF) unit; and a processor configured to:

transmit a physical downlink control channel (PDCCH) order to a user equipment, wherein the PDCCH order indicates an initiation of a random access procedure with the base station, and wherein the PDCCH order includes a carrier indicator field and a predefined set of values of:

a 1-bit flag indicating a localized/distributed resource block assignment, and a resource block assignment field, and receive a random access preamble from the user equipment through an uplink component carrier corresponding to a value of the carrier indicator field among a plurality of uplink component carriers configured between the user equipment and the base station.

17. The base station of claim 16, wherein the PDCCH order includes a cyclic redundancy check (CRC) scrambled with a cell radio access network temporary identifier (C-RNTI).

18. The base station of claim 16, wherein the 1-bit flag indicating the localized/distributed resource block assignment is set to 0, and all bits of the resource block assignment field are set to 1.

19. The base station of claim 16, wherein the plurality of uplink component carriers have a plurality of uplink synchronization timings.

20. The base station of claim 16, wherein the processor is further configured to transmit a random access response to the user equipment, and the random access response includes a timing advance (TA) command for the uplink component carrier in response to the random access preamble.

* * * * *